Nov. 25, 1958  F. VAN MARLE  2,861,677
CONVEYOR MECHANISM
Filed Sept. 25, 1956  4 Sheets-Sheet 1
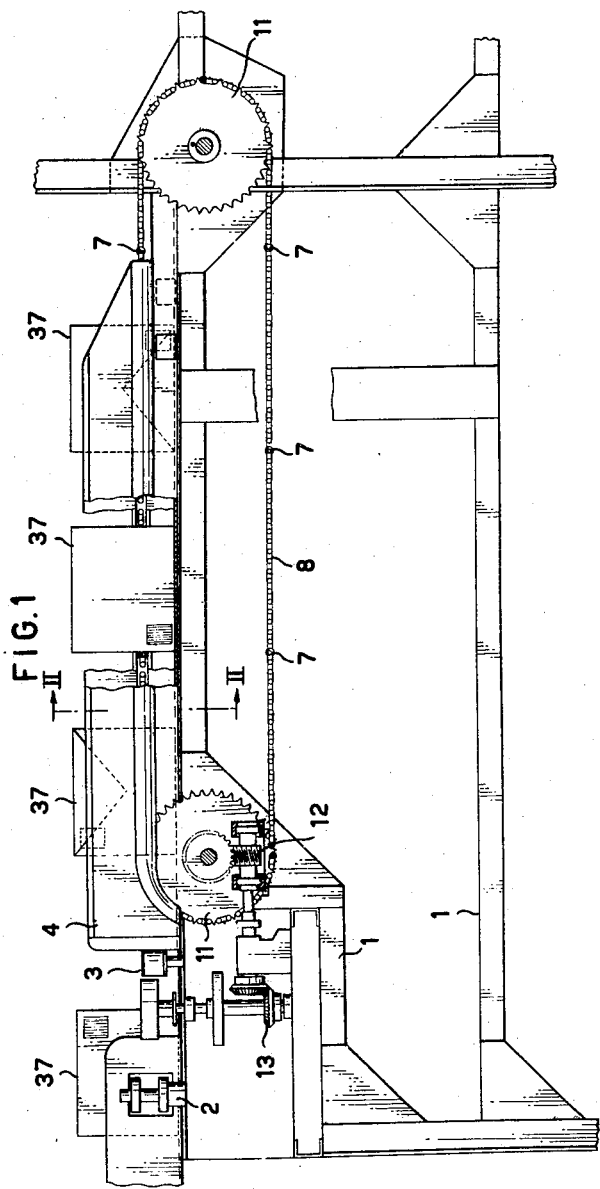
INVENTOR
FREDERICK VAN MARLE
BY
ATTORNEY

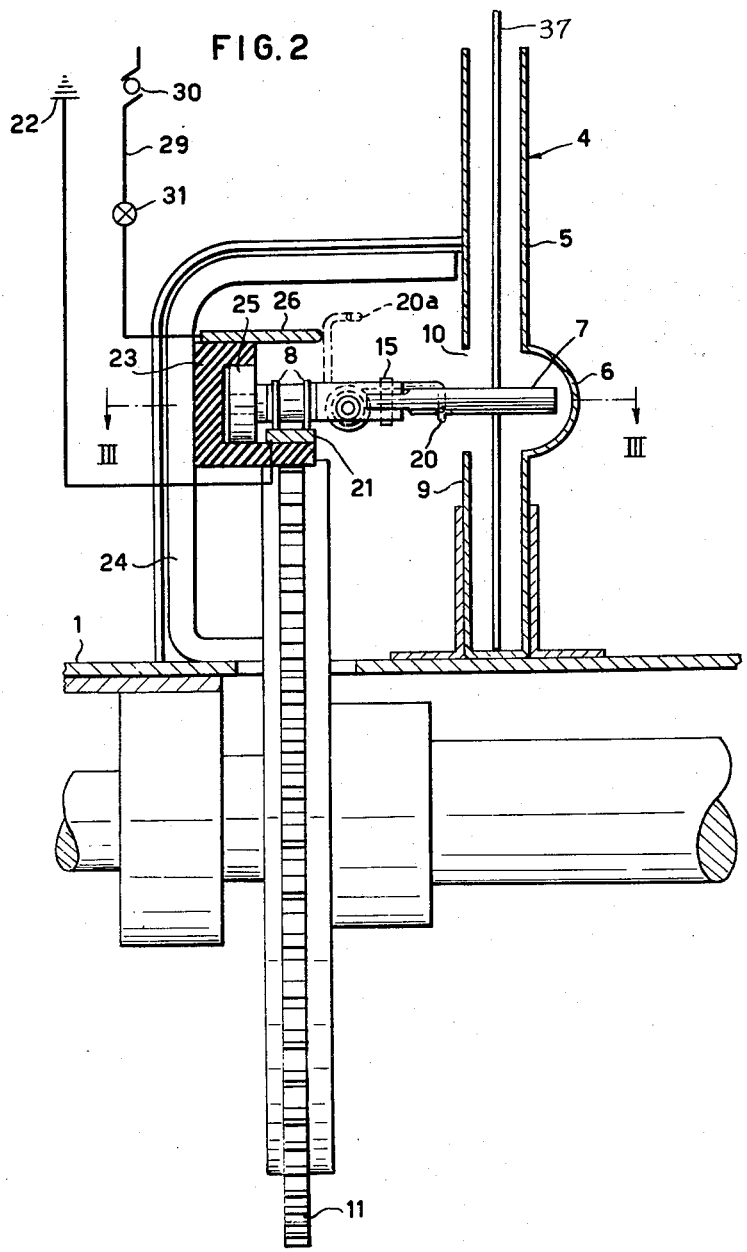

Nov. 25, 1958 F. VAN MARLE 2,861,677
CONVEYOR MECHANISM
Filed Sept. 25, 1956 4 Sheets-Sheet 3
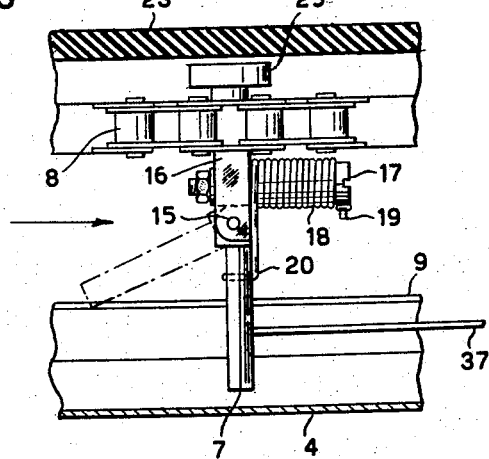
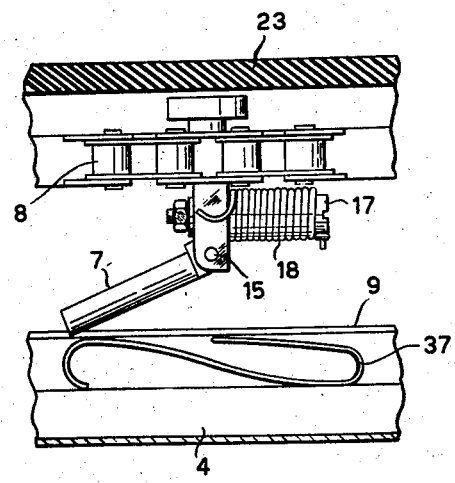
INVENTOR
FREDERICK VAN MARLE
BY
ATTORNEY Nov. 25, 1958　　　F. VAN MARLE　　　2,861,677
CONVEYOR MECHANISM
Filed Sept. 25, 1956　　　　　　　　　　4 Sheets-Sheet 4
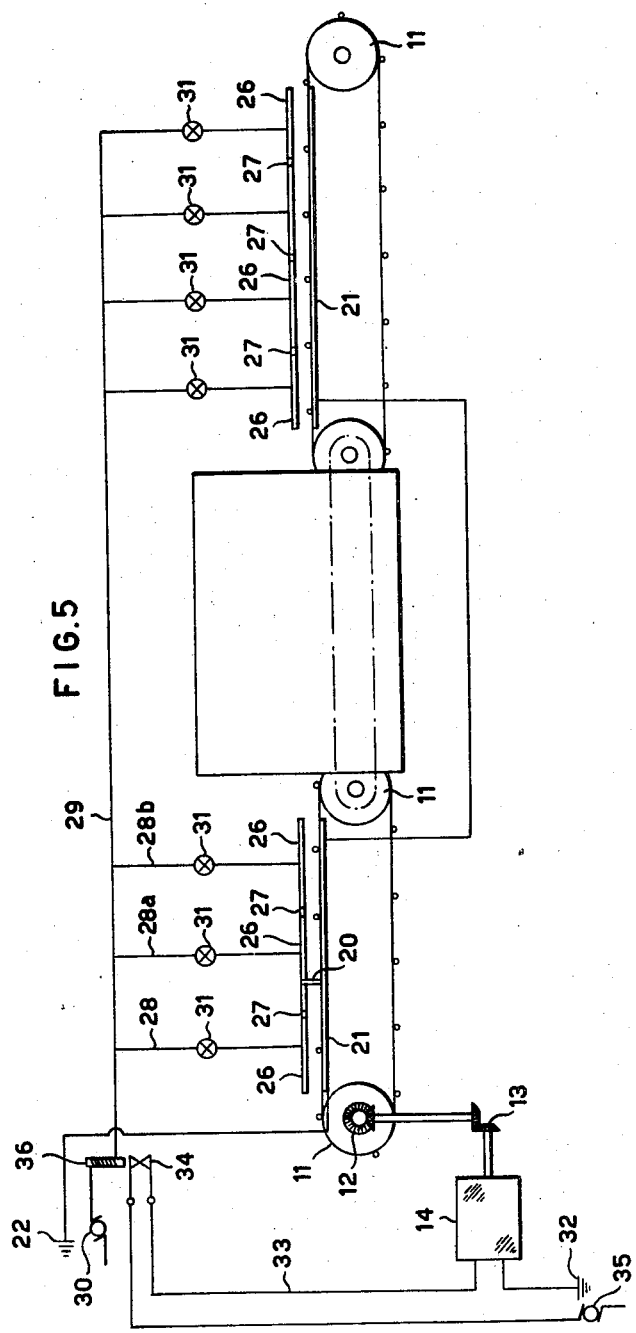
INVENTOR
FREDERICK VAN MARLE
BY
ATTORNEY

United States Patent Office 2,861,677
Patented Nov. 25, 1958

2,861,677

CONVEYOR MECHANISM

Frederick van Marle, The Hague, Netherlands, assignor to N. V. Technische Maatschappij Marchand-Andriessen, The Hague, Netherlands, a limited liability company of Netherlands Application September 25, 1956, Serial No. 611,817

9 Claims. (Cl. 198—232)

This invention relates to mail handling equipment of the type wherein mail pieces are mechanically transported by conveyor means and has for its object to provide an improved conveyor for transporting the pieces in spaced tandem fashion.

Another object is to provide a conveyor for transporting mail pieces individually in tandem fashion by pushing the pieces individually, the pusher means being equally spaced on a continuous chain or belt.

More particularly it is a principal object of this invention to provide a chain conveyor, as above described, having equally spaced pusher fingers, the fingers being sensitive to a mail piece having a shape, size or condition such that it will not travel freely in the conveyor, thereby to stop the conveyor so that the offending mail piece may be manually removed.

Another object of the invention is to provide a conveyor having mail piece pusher fingers which flex in response to undue resistance of a mail piece of abnormal size, shape or condition to being pushed along the conveyor, said fingers by flexing causing the conveyor to stop its operation and to indicate the point in the conveyor in which the jamming has occurred.

A further object is to provide a flexible conveyor finger, as above described, which when it flexes, closes an electric circuit to cause the conveyor and the conveyor feed device to stop their operation, said circuit including a plurality of electric bulbs in parallel so that illumination of a bulb indicates the particular region of the conveyor in which the stoppage has been caused.

Other objects and advantages will become hereinafter more fully apparent as reference is had to the accompanying drawings in which my invention is illustrated and in which Figure 1 is a side elevation of my improved mail piece conveyor, partially broken away for illustrative purposes, Figure 2 is an enlargened transverse vertical section taken along the line II—II of Figure 1, Figure 3 is a horizontal section taken along the line III—III of Figure 2, Figure 4 is a view similar to Figure 3 showing a pusher finger flexing in response to a crumpled mail piece, and Figure 5 is a diagrammatic view of the conveyor and associated electrical system.

More particularly, 1 designates the frame of the conveyor which may be a part of a mail piece facing machine or a part of a mail piece sorting machine or simply a conveyor used to transport mail pieces from one station to another in a mail handling system. This frame 1 is equipped with a separator 2 into which small mail pieces such as letters and post cards 21 are fed in vertical position. The separator 2 feeds the mail pieces one at a time to the rollers 3 which, in turn, propel them into one end of a trough 4 which is seen in cross-section in Figure 2.

The trough 4 has an outside wall 5 having a bulge 6 along the length thereof to permit passage of conveyor pusher fingers 7 which are mounted at regular spaced intervals on a conveyor chain 8. The inside wall 9 of the trough has a slot 10 for the passage of the fingers.

Spaced sprocket wheels 11 drive the chain 8, these wheels being driven by gearing 12, 13, which, in turn, are drawn by a motor 14 (Fig. 5).

As best seen in Figures 2, 3 and 4, the outer part of the fingers 7 are hingedly mounted at 15 on an inner part 16 secured directly to the chain 8. Extending through each inner part 16 is a pin 17 which parallels the links of the chain 8 and around which is placed a coil spring 18. This spring is anchored to the pin 17 at one end 19 while its other end terminates in a hook 20. By depressing the hook end 20 against the tension of the spring, the hook cradles the end of the finger 7 and holds it in extended position shown in full lines in Figures 2, 3 and 4. The outer end of the finger 7 is thus cradled by the hook 20 but has a breakaway relation therewith in the event that the end of the finger encounters abnormal resistance.

The upper flight of the conveyor chain 8 rides on a track 21 of electrically conductive material which, as shown in Figures 2 and 5 is grounded at 22. This track rests on a race 23 made of electrically insulating material and supported by the brackets 24 which arise from the main frame 1. The race 23 receives the guide rollers 25 of the conveyor chain 8.

On top of the race 23 I provide a series of electrically conductive plates 26 which are insulated from each other at 27 and each of which serve as terminals for an electrical circuit. These terminals 26 are each connected to an electrical line 28, 28a, 28b, etc. each of which is connected directly to a main electrical line 29. The line 29 is connected to a source of electrical energy 30. Each line 28, 28a, 28b, etc. has an electric bulb 31 incorporated therein.

A second electrical circuit is provided by the line 33 which is grounded at 32 and connected to the motor 14 for energization thereof. The line 33 then continues to a switch 34 and thence to a source of electrical energy 35. The switch 34 is associated with a solenoid 36 in the line 29 so that when the circuit 29 is energized the switch 34 is opened by the solenoid 36 in order to stop the operation of the motor 14 which drives the separator 2 and the conveyor chain 8.

The operation will now be explained. Assume that the circuit 33 is closed so that the motor 14 is driving the separator 2 and chain 8. Mail pieces 37 are being fed into the end of the trough 4 where they individually get into the path of a finger 7. They are propelled longitudinally along the trough. If a mail piece becomes crumpled or, for any other reason jams in the trough 4 it then offers abnormal resistance to propulsion by the finger 7. The outer end of the finger then flexes and rides out of engagement with the hook 20 of the spring 18 thus permitting the hook 20 to rise into the dotted line position 20a (Fig. 2) where it contacts a terminal 26 of a line 28, 28a, 28b . . . , the terminal of the line 28a being shown as the one being contacted in Figure 5.

The spring 18 and the conveyor chain 8 being conductive co-act with the spring hook 20 to establish an electrical circuit from the source 30 through the lines 29 and 28a to the conductor 21 and to the ground 22. The bulb 31 in the circuit 28a becomes illuminated thus indicating the region of the jamming which caused the stoppage.

Energization of the line 29 energizes the solenoid 36 which opens the switch 34 thus causing the motor 14 to stop.

Various changes may be made without departing from the spirit of my invention and I therefore desire to be extended protection as defined by the appended claims.

What I claim is:

1. A conveyor comprising a conveyor chain having a plurality of pusher fingers attached laterally thereto, a trough having a slot in one vertical wall thereof through which said fingers project, said fingers each being hingedly mounted on said chain exteriorly of said trough, said fingers propelling articles longitudinally of said trough upon actuation of said chain, said fingers each being capable of swinging to a position out of said trough and out of the path of the article being propelled thereby in response to undue resistance being offered by said article to being propelled through said trough.

2. A conveyor comprising a conveyor chain having a plurality of spaced pusher fingers attached laterally thereto, a trough having a slot through one vertical wall thereof through which said fingers project, said fingers each propelling an article longitudinally of said trough upon actuation of said chain exteriorly of said trough, said fingers each being hingedly connected to said chain, a spring pressed breakaway device retaining each of said fingers in normally extended position and into said trough, said fingers each disengaging from said breakaway device and swinging out of the path of the article being propelled in response to undue resistance of said article to propulsion along said trough.

3. A conveyor comprising a conveyor chain having a plurality of fingers attached laterally thereto at regularly spaced intervals, each of said fingers being composed of a carrier portion attached to said chain and an outer portion hingedly connected to said carrier portion, a pin transversely through said carrier portion parallelling said chain, a spring around said pin having one end anchored thereto and the other end terminating in a hook shape, the outer portion of each of said fingers being cradled in said hook shaped spring end whereby said outer portion is maintained in a position normal to said chain, said hook-shaped end forming a breakaway relation with the outer portion of said finger and releasing its contact with said outer portion in response to abnormal pressure being imposed on said outer portion.

4. A conveyor comprising a conveyor chain having a plurality of pusher fingers attached laterally thereto, a U-shaped trough having a slot through one vertical wall thereof through which said fingers project, said fingers being adapted to propel mail pieces longitudinally of said trough during actuation of said chain, each of said fingers having two parts, the inner one of which is fixedly secured to said chain and the outer one of which is hingedly connected to said inner one, a spring having one end anchored to said inner part and having its outer end terminating in a hook, said outer part being cradled in said hook whereby said spring maintains said outer part in extended position, said outer part breaking away from contact with said hook in response to undue resistance being offered by the mail piece to propulsion through said trough.

5. In a conveyor for mail pieces the combination of a trough, a separator feeding mail pieces individually in tandem into said trough, a conveyor chain alongside said trough, a motor driving said chain and said separator, spaced fingers mounted laterally of said chain and projecting into said trough, said fingers each propelling a mail piece longitudinally through said trough, said fingers each being capable of flexing to a position out of said trough in response to abnormal resistance to propulsion by a mail piece, and means actuated by the flexing of any one of said fingers for halting the operation of said motor whereby operation of said chain and said separator is stopped.

6. In a conveyor for mail pieces the combination of a U-shaped trough, a separator feeding mail pieces individually in tandem into said trough, a conveyor chain paralleling said trough and having fingers carried thereby each projecting into and across the interior of said trough, an electric motor driving said separator and said chain, each of said fingers being composed of two parts, the inner part of which is fixedly secured to said chain and the outer part of which is hingedly connected to said inner part, a spring carried by and anchored at one end to said inner part, the other end of said spring being in the shape of a hook and cradling the outer part of said finger, said spring being under substantial tension, said outer finger part breaking out of its cradled relation with said hook in response to abnormal pressure being exerted thereagainst, said hook upon release of said outer finger part actuating a switch to cause said motor to stop.

7. In a conveyor for mail pieces, the combination of a U-shaped trough, a separator feeding mail pieces individually into one end of said trough, a conveyor chain alongside said trough having fingers extending laterally therefrom and across the interior of said trough, said fingers each being hingedly connected to said chain and maintained in extended position across said trough by a spring breakaway device, said fingers each being adapted to propel a mail piece longitudinally through said trough, said fingers each being capable of disengaging from said breakaway device and swinging out of said trough in response to abnormal resistance of a mail piece to propulsion, an electric circuit having a terminal adjacent said chain, the spring of said breakaway device upon disengaging a finger contacting said terminal thereby causing current to flow in said electrical circuit, an electric motor energized by current from a second electrical circuit driving said separator and said chain, and a switch operable in response to energization of the first named electrical circuit to interrupt the flow of current in said second circuit whereby said separator and said chain are stopped in response to jamming of a mail piece in said trough.

8. In a conveyor for mail pieces the combination of a U-shaped trough, a separator feeding mail pieces individually into one end of said trough, a conveyor chain, the upper flight of which rides a track paralleling said trough, said chain having pusher fingers traversing the interior of said trough propelling said mail pieces longitudinally thereof, each of said fingers having an inner portion secured to said chain, an outer portion hingedly connected to said inner portion and a spring anchored at one end to said inner portion, said spring having its other end of hook shape to cradle said outer portion thereby maintaining it in extended position, said outer portion being capable of dislodgment from said hook by jamming of a mail piece in said trough, said track being electrically conductive and grounded, a series of terminals insulated from each other and arranged in a line parallelling said track, an electric line connected to a source of power supply, parallel electrical lines each having an electric bulb therein and each connecting said electric line to one of said terminals, said outer portion of each finger when dislodged from said spring hook allowing said hook to bridge the electrical distance between said track and one of said terminals, said hook closing the circuit from said electrical line through one of said bulbs thence through said track and to ground, whereby the illuminated bulb indicates the location of the jammed mail piece.

9. In a conveyor for mail pieces the combination of a U-shaped trough, a separator feeding mail pieces individually into one end of said trough, a conveyor chain, the upper flight of which rides a track paralleling said trough, said chain having pusher fingers traversing the interior of said trough propelling said mail pieces longitudinally thereof, each of said fingers having an inner portion secured to said chain, an outer portion hingedly connected to said inner portion and a spring anchored at one end to said inner portion, said spring having its other end of hook shape to cradle said outer portion thereby maintaining it in extended position, said outer portion being capable of dislodgment from said hook by jamming of a mail piece in said trough, said track being electrically conductive and grounded, a series of terminals insulated from each other and arranged in a line paralleling said track, an electric line connected to a source of power supply, parallel electrical lines each having an electric bulb therein and each connecting said electric line to one of said terminals, said outer portion of each finger when dislodged from said spring hook allowing said hook to bridge the electrical distance between said track and one of said terminals, said hook closing the circuit from said electrical line through one of said bulbs thence through said track and to ground whereby the illuminated bulb indicates the location of the jammed mail piece, and means responsive to the establishment of a current flow in said electrical line simultaneously stopping the operation of said separator and said chain.

References Cited in the file of this patent

UNITED STATES PATENTS

| | | |
|---|---|---|
| 1,358,167 | Levin | Nov. 9, 1920 |
| 2,555,880 | Fruechtel | June 5, 1951 |

FOREIGN PATENTS

| | | |
|---|---|---|
| 611,794 | Germany | Apr. 6, 1935 |